Patented July 26, 1938

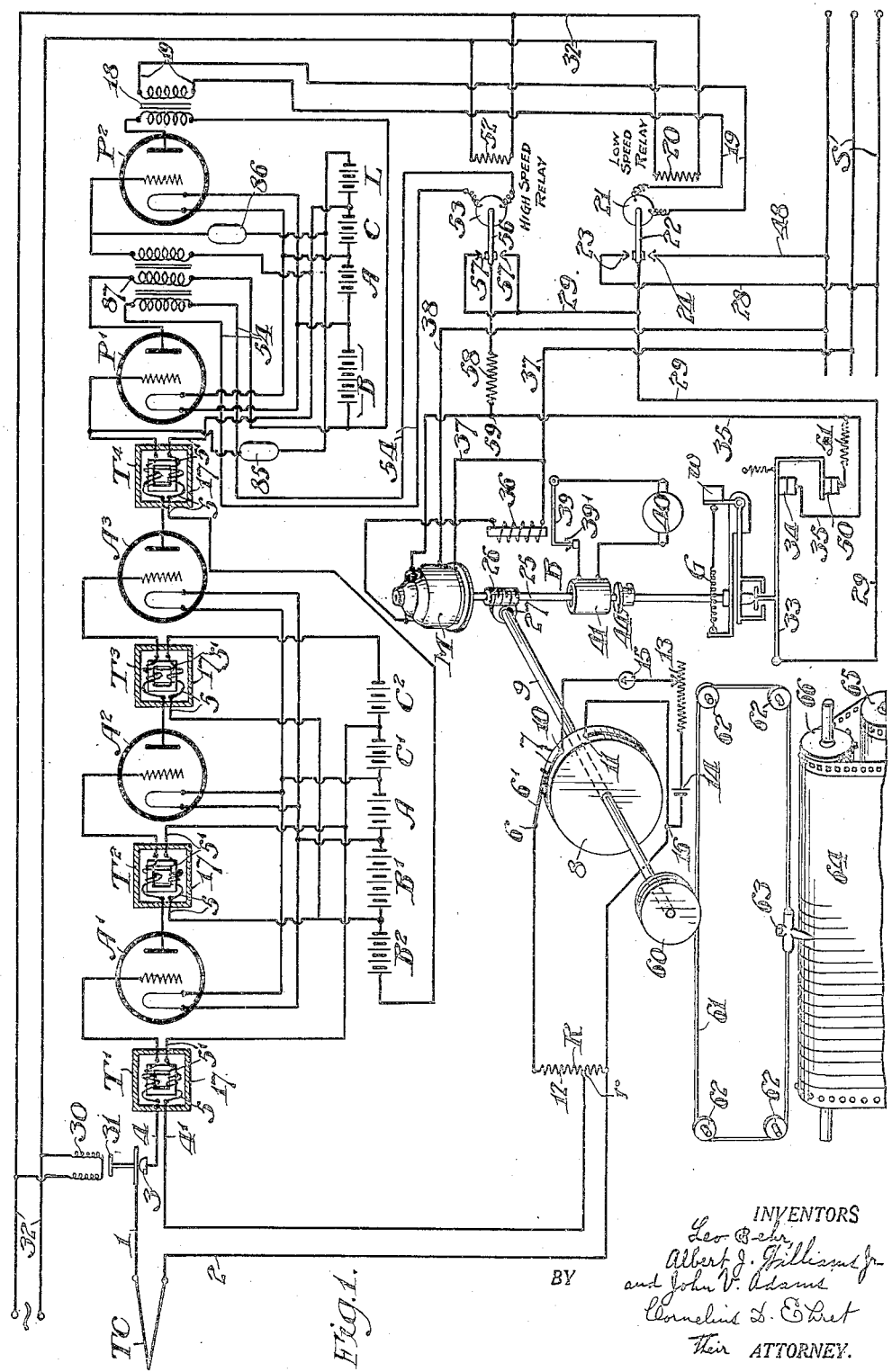

2,124,684

UNITED STATES PATENT OFFICE 2,124,684

RECORDER AND CONTROL SYSTEM

Leo Behr and Albert J. Williams, Jr., Philadelphia, Pa., and John V. Adams, New Rochelle, N. Y., assignors to Leeds & Northrup Company, Philadelphia, Pa., a corporation of Pennsylvania Application April 1, 1932, Serial No. 602,424
Renewed January 15, 1938

22 Claims. (Cl. 172—239)

Our invention relates to a method of and apparatus for indicating, recording and/or controlling the magnitude of a condition, such as thermal, electrical, mechanical, physical, or chemical, or departure from a predetermined magnitude of such condition.

In accordance with the invention, an effect, as mechanical movement, an electromotive force, etc., which varies in magnitude and direction in accordance with a condition of unbalance in an electrical system due to departure from a predetermined magnitude of a given condition, causes the actuation of structure in a direction and by an amount which will restore a condition of balance, and at a high or low rate dependent upon the amount of unbalance or departure; more particularly, a reversible electric motor, or equivalent, actuates structure, for example, a potentiometer recorder, at high speed for relatively large departures of a given condition from a predetermined magnitude, and at a low speed for relatively small departures, quickly to restore a condition of balance of the potentiometer or other structure without overrunning or hunting, and to give a null measurement of the magnitude of the condition.

The driving motor is controlled by a governor when running at low speed for small departures of the condition from a predetermined magnitude, which governor is cut out when the motor is running at high speed for large departures. When a condition of balance is approached the speed of the motor is changed from high to low, and a brake applied until the motor is running at low speed, at which time the brake is released and is off during low speed operation, but is again applied to stop the motor when a condition of balance obtains.

Specifically, and in accordance with one modification of the invention, a thermocouple, or equivalent, which generates a voltage in accordance with the temperature at its hot point junction, is in heat transfer relation with a body or structure whose temperature is to be determined, and is connected to a potentiometer recorder circuit in opposition thereto, so that when an unbalanced condition obtains a current will be produced whose magnitude and direction of flow vary in accordance with the amount and direction, respectively, of departure from a predetermined magnitude of a temperature condition; the current is modulated by a microphone, or equivalent, and amplified by a thermionic amplifier, and relays connected to the output circuit of the amplifier are selectively actuated, and control the direction and speed of a motor in accordance with the direction and amount of unbalance of the potentiometer circuit, the motor causing the potentiometer to be adjusted to restore the balance, and to record the magnitude of the condition.

The currents or potentials produced by the thermocouple are very small, and the corresponding amplified currents passing through the transformers of the thermionic amplifier are also small; the transformers are subject to disturbing magnetic fields, and the resultant effects of these fields in the windings of the transformers may be comparable with the effects produced by the said amplified currents, so that superposition of the disturbing effects thereon will introduce substantial error in the measuring or control system, and, preferably, the transformers in the input and output circuits of one or more stages of the amplifier are surrounded or enclosed by magnetic shields to avoid the disturbing effects and increase the accuracy of the system.

Specifically, and in accordance with another modification of the invention, movement of a pressure gauge, or equivalent, in accordance with departure from a predetermined pressure condition in a pipe line causes switch structure to actuate a motor in different directions and at different speeds dependent upon the direction and magnitude, respectively, of movement of the gauge, the motor actuating valve structure to restore said predetermined pressure condition.

The invention resides in a method, system, and apparatus of the character hereinafter described and claimed.

To understand the invention, and for illustration of some of the various forms it may take, reference is had to the accompanying drawings, in which:

Fig. 1 shows a null type recorder system in accordance with the invention.

Figure 3:
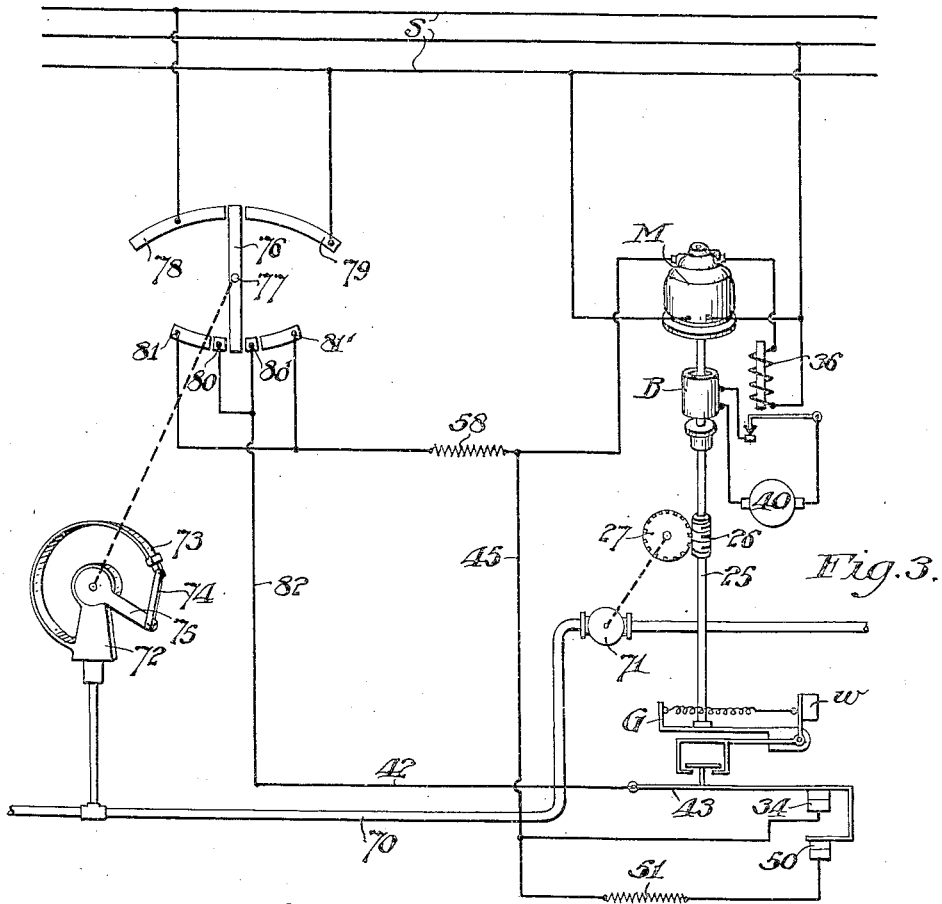
Fig. 3 is a modified form of the invention.

In systems for determining and recording the temperature of apparatus such as a boiler, furnace, and the like, it is often desirable or necessary to employ a thermocouple which is placed in heat intensity relation, for example, by a radiation pyrometer, to the apparatus whose temperature is to be ascertained or recorded, and to utilize the electromotive force or current generated by the thermocouple due to changes in temperature of its hot junction to control indicating and recording devices. The electromotive force or current obtainable from a thermocouple, however, is very feeble, often of the order of a few millivolts only, and it is not possible to get sufficient power from the feeble currents set up in an ordinary thermocouple circuit to satisfactorily operate a pair of contacts or other means for directly controlling a source of auxiliary power. The present invention is particularly applicable to such a system for actuating at high speed a potentiometer recorder.

Referring to Fig. 1 of the drawings, a thermocouple TC, which is in heat transfer relation to the apparatus (not shown) whose temperature is to be ascertained, may be located at a distance from the remainder of the circuit, and connected thereto by means of conductors 1 and 2. One pole, for example, the positive pole, of the thermocouple is connected by conductor 1 to a microphone or other equivalent interrupting or resistance varying means 3, and thence to the input terminal 4 of the thermionic amplifier shown. After passing through the primary winding 5 of input transformer T1 of the amplifier, the thermocouple circuit is connected from terminal 4' of the amplifier to a given point on a resistance 12, the resistance being connected across the terminals 6 and 16 of a potentiometer circuit.

The potentiometer circuit comprises a sliding contact arm 6' which bears upon a slide wire resistance 7 mounted on the periphery of an insulating drum 8, the drum being rotatably mounted on shaft 9, and operated so that the position of the drum 8 represents the voltage of the thermocouple, as hereinafter explained. Included in the potentiometer circuit and connected across terminals 10 and 11 of the slide wire is a variable resistance 13, and a battery cell 14 which supplies constant current to the potentiometer circuit. A milliammeter or equivalent instrument 15 may be connected in the potentiometer circuit to measure the current flowing therein. The other or negative pole of the thermocouple is connected by conductor 2 to one end of the resistance 12, as shown, and thence to the other terminal 16 of the potentiometer circuit.

The battery cell 14 is connected in opposition to the thermocouple, and therefore when the resistance of the potentiometer circuit, including the effective resistance of the slide wire, has such value that the potential across the portion $r$ of the resistance 12 is equal to the potential produced in the thermocouple circuit, the potentials of the circuits are equal and opposite and there will be no current flow through the microphone. The values of the resistance 12 and variable resistance 13 are made such that when the position of the drum 8 corresponds to the temperature of the thermocouple, the potential or voltage of the current generated by the thermocouple will just equal the voltage across the portion $r$ of the resistance 12 as established by the potentiometer circuit, under which condition no current will flow in the microphone circuit.

The use of the resistance 12 intermediate the thermocouple and potentiometer circuits, materially reduces the effect of electrical pick-up by the slide wire 7 of the potentiometer, and thus reduces the disturbing effect due to such pick-up, by attenuating a relatively large voltage down to a smaller range. The ratio $$\frac{r}{R}$$

of the two portions of resistance 12 expresses the attenuation obtainable. The resistance of R is preferably large as compared to that of slide wire 7, so that little current is drawn from the slide wire. The advantage of the resistance 12, is pronounced for low voltage ranges, such as the range of a thermocouple. For example, with a one millivolt range, one volt on slide wire 7 would be attenuated 1000 times, and the pick-up would be accordingly reduced by a factor of 1000. The use of the resistance 12, however, is not part of the present invention, and need not be used, in which event the input terminal 4' of the amplifier would be connected directly to terminal 6, and conductor 2 of the thermocouple circuit would be connected directly to terminal 16, of the potentiometer circuit.

When the temperature of the apparatus measured increases or decreases from a predetermined magnitude, the potential generated by the thermocouple will be correspondingly larger or smaller, and in either case an unbalanced condition between the thermocouple and potentiometer circuits obtains and current flows through the microphone and input circuit of the amplifier; when the temperature increases from a predetermined magnitude the current will flow in a direction from the positive pole of the thermocouple because there will be a greater potential produced by the thermocouple than the opposing potential of the potentiometer circuit, and when the temperature decreases from the predetermined magnitude the potential of the thermocouple is less than that of the potentiometer circuit and current will flow in the opposite direction through the microphone and input circuit of the amplifier. The voltage and direction of the current flowing, when an unbalanced condition obtains, will therefore vary in accordance with the departure from a predetermined magnitude of temperature.

The resistance of the microphone 3 is periodically varied by electromagnetic means 30 having its armature 31 mechanically connected to the microphone button, the armature being vibrated from an alternating current supply line 32 which is preferably, although not necessarily, a source of 60 cycle current. This periodic variation by the microphone of the current flowing when an unbalanced condition obtains causes the potential of the grid of the first amplifier tube A1 to be periodically varied, and at the output terminals of the amplifier, there will be available an alternating current, or a current having an alternating component, which varies in magnitude in accordance with the magnitude of the current flowing in the microphone circuit, and which has a predetermined phase relation with respect to the alternating current supply line, dependent upon the direction of flow of the current in the microphone circuit, as described and claimed in a copending application of Albert J. Williams, Jr., Serial No. 569,126, filed October 15, 1931, abandoned in favor of continuing application Serial No. 634,425, filed September 22, 1932.

The magnitude of the potential across the secondary winding 5' of the input transformer T1, and therefore the potential impressed upon the grid of the input tube A1, is a function of the rate of change of current in the primary winding 5 of the transformer, or, with a constant rate of change of resistance in the microphone 3, it is a function of the net voltage existing in the microphone circuit. When an unbalanced condition obtains, and a current is flowing in a given direction through the primary winding 5;

then, during the half-cycle of the alternating current supply source 32 in which the direction of movement of the relay armature 31 is such as to decrease the resistance of microphone 3, the current flowing in winding 5 will be increasing and therefore the potential across the secondary winding 5' will likewise be increasing. During the succeeding half-cycle of the alternating current source, however, the resistance in the microphone will be decreasing, and the potential across the secondary winding will be similarly decreasing in value. The magnitude of the potential impressed upon the grid will also depend upon the net voltage existing in the thermocouple and potentiometer circuits, that is, upon the potential of the current flowing in the microphone circuit.

A biasing potential, which is negative in the usual type of amplifier, is normally applied to the grid, as by the battery C1, its value being such that the swing of the potential impressed by the input transformer upon the grid will not cause the tube to operate on the rectifying portion of its grid-voltage plate-current characteristic curve. The instantaneous polarity of the grid of tube A1 with respect to the biasing voltage depends upon the direction of flow of the current in the microphone circuit.

The potential variations on the grid of the input tube A1 are amplified by the successive stages of the amplifier shown. The amplifier may comprise any of the various well-known types suitable for the purpose, and as many intermediate stages may be employed as are necessary to produce the desired power output. In the amplifier shown in Fig. 1, three amplifier tubes A1, A2 and A3 are shown, the last two stages of the amplifier comprising power tubes P1 and P2.

In order to avoid the disturbing effects of stray magnetic fields, the transformers T1, T2, T3 and T4 in the input and output circuits of the first three stages A1, A2, and A3 of the amplifier are each enclosed in a magnetic shield 17. Various types of magnetic shields or shielding means may be employed, although preferably the primary and secondary windings 5 and 5' of each transformer are symmetrically wound on a core, and one or more magnetic shields 17 are disposed symmetrically about each core structure, as disclosed and claimed in Williams Patent No. 1,916,352. It will generally be found unnecessary to shield the coupling and output transformers connected to the power tubes P1 and P2, since the current and voltage values in these transformers are sufficiently large to negative the effect of stray fields thereon; although it may be found desirable or necessary in certain cases to employ shielded transformers in the power stages. It will also be understood that under certain conditions, or for certain purposes, it may be unnecessary to shield some or any of the transformers.

The output of the last stage, which comprises the power tube P2, is delivered through the transformer 18 to the output terminals 19 of the amplifier. There is thus impressed upon the output terminals an alternating current having a predetermined phase relation with respect to that of the alternating current supply line, and whose magnitude is dependent upon the potential applied to the grid of the input tube. The magnitude and phase of the output current is therefore dependent upon and varies as the magnitude and direction, respectively, of the current flowing in the thermocouple and microphone circuits. At any instant the output current will, in general, be either in phase, or 180° out of phase, with the alternating current supply line, dependent upon the number of amplifier stages employed and the manner in which they are connected.

An alternating current relay, or equivalent, hereinafter referred to as the low speed relay, has its field winding 20 energized from the alternating current supply line 32, and has its armature 21 connected, as by flexible connections, slip rings, or brushes, to the output terminals 19 of the amplifier. The relay may comprise a commutator type of alternating current motor, or it may consist of a pair of coils or windings, as in a galvanometer, in which the moving coil, winding or armature is connected to the output terminals 19 and the fixed coil or field is connected to the alternating current line 32. The armature is normally biased, as by a spring (not shown), to the intermediate position shown in Fig. 1; when current from the output terminals 19 of the amplifier is flowing through the armature 21 in one direction, with respect to the alternating current supply line 32, the armature will move or rotate in a given direction, for example, in a clockwise direction as viewed in Fig. 1. If the current is flowing through the armature in the opposite direction, with respect to the alternating current supply line 32, the armature will move or rotate in the opposite, or counter-clockwise direction. The armature controls, by means of normally open contacts 22, 23, and 24, the operation of a reversible motor M, which motor controls, by means of shaft 25, gears 26 and 27, and shaft 9, the position of slide wire drum 8 of the potentiometer. The motor may be either a direct current motor, or a commutator type alternating current motor.

As hereinafter explained, the connections are made so that when the potentiometer and thermocouple circuits are unbalanced, the motor M will drive the drum 8 in either direction, dependent upon whether the voltage across the thermocouple circuit is greater or less than that across the potentiometer circuit, until a neutral position of the potentiometer is obtained, in which position the potentials of the respective circuits will again balance each other. The position of the drum 8 accurately represents the voltage of the thermocouple TC, and therefore the temperature of the furnace or other apparatus.

Connected to the shaft 9 is a drum 60 about which is wound a belt 61 which passes over pulleys 62 and to which is attached a stylus pen or marker 63 which bears against a recording sheet 64. The recording sheet is unwound from a roll 65 and is driven at a uniform rate by teeth or pins on roller 66 which engage perforations in the edge of the sheet, and since the magnitude of the temperature is recorded at every instant by stylus 63, the recording sheet presents an accurate record with respect to time of the temperature conditions obtaining in the furnace or other apparatus.

The manner in which the motor M is controlled by the low speed relay is as follows:

The field winding of the motor is permanently connected by means of conductors 37 and 38 across one side of a three-wire power circuit S, carrying either direct or alternating current, dependent upon whether motor M is a direct or alternating motor. When the direction of the output current of the amplifier is such that the low speed relay will be moved or rotated in a clockwise direction, contacts 22 and 23 will be closed. This completes a circuit from one side of the three-wire power circuit for energizing the armature of motor M in a given direction, by means of conductor 28 from the power circuit, contacts 22 and 23 which are now closed, conductor 29, contact arm 33 connected to the governor mechanism of motor M, governor control contacts 34, now closed, and conductor 35 to the armature return winding of the motor, the return circuit passing through the winding 36 of a brake relay, and conductor 37 to the middle or neutral leg of the three-wire supply circuit.

An electromagnetic brake B has a solenoid winding enclosed in a casing 41 which is stationary with respect to the shaft 25 of the motor M, and a cooperating disk-shaped brake clutch 44 secured to and adapted to revolve with shaft 25. When the motor M is not energized, the brake is applied by means of a source of energizing current 40, which may be either direct or alternating, connected in circuit with the electromagnet of the brake, by means of armature 39 and contacts 39', the armature being controlled by the winding 36.

Figure 2:
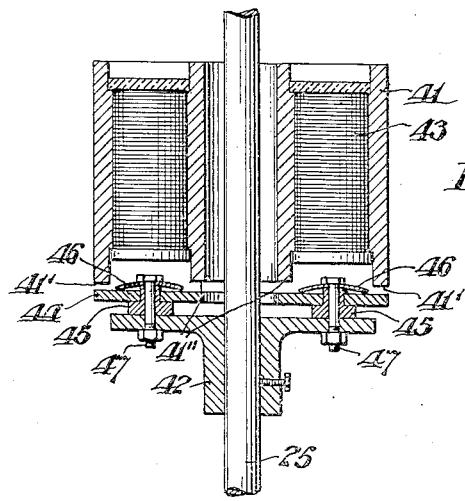
Fig. 2 is a sectional view of electromagnetic braking mechanism employed.

The details of the brake mechanism are shown in Fig. 2. The brake comprises a shell or housing 41, preferably of metal, within which is positioned an electromagnet or solenoid winding 43, the energization of which is controlled by the position of the contacts 39'. A steel armature disk 44 is slidably mounted on the reduced portions of fibre washers 45 and is biased in position against the heads of the washers by means of the dished springs 46. Bolts 47 clamp the assembly to a metal support member 42, secured to shaft 25, as by a set-screw. When electromagnet 43 is energized the disk 44 is attracted, against the force of springs 46 to the surface 41' of casing 41, and thus brakes the shaft 25. The speed of action of a brake is dependent upon the length of the air gap between the magnet poles, because if the air gap is made small the magnetic force acting upon the armature is greater, and the armature also travels a shorter distance. When the armature disk 44 is drawn to the electromagnet casing 41, the force of the small springs 46 is very small in comparison to the magnetic force, but when the magnetic force is removed, the force of the springs is sufficient to return the armature to its position against the fibre washers and hold it there while the armature revolves. The armature contacts only with the outer portions 41' of the iron case 41. A small clearance is left between the armature and the inner projections 41'' of the iron case in order to obtain quick release.

When current flows through the motor armature circuit, this energizes relay winding 36, attracting armature 39 and opening contacts 39' of the motor braking circuit, thus releasing the brake. The motor is now free to start under the control of the low speed relay. If the output current of the amplifier is in the opposite direction from that above stated, the low speed relay will rotate in the opposite or counter-clockwise direction, and contacts 22 and 24 will be closed, and motor M will be energized through conductor 48 connected to the other outside leg of the motor supply circuit. The current flowing through the motor armature will therefore be in the opposite direction, and since the field is permanently connected to the power circuit, the motor M will revolve in the opposite direction, so that the motor is caused to revolve in either direction, dependent upon the direction of rotation of the low speed relay. When the motor has driven the slide wire drum 8 of the potentiometer to a position where the potentiometer and thermocouple circuits are balanced, there will be no output current from the amplifier passing through the low speed relay, which will return to its normal open position, thus interrupting the armature circuit of motor M.

A governor G on motor M, actuated by a flyball or weight w, controls the position of contacts 34, so that when the motor reaches a certain speed, for example, 150 R. P. M., the governor contacts 34 will open, and thus resistance 51 will be inserted in circuit through the auxiliary contacts 50, which remain closed at this time.

A second relay, hereinafter referred to as the high speed relay, has its field winding 52 energized from the alternating current supply line 32, and its armature 53 connected by means of a flexible connection to the output circuit 54 of the first power tube P1. The high speed relay is normally biased to the position shown in Fig. 1, and is similar in construction to that of the low speed relay, but is adapted to be actuated only when the current flowing in the thermocouple circuit is relatively large, and of such value that the output of power tube P1 is sufficient to energize the relay. The low speed relay will, of course, also be energized during the period that the high speed relay is energized. The high speed relay controls, by means of normally open contacts 56 and 57, the connection of a resistance 58 between conductor 29 and the point 59 in the driving motor circuit, the resistance thus being placed in shunt with the governor contacts so that the motor runs independently of its governor, and thus may attain higher speeds. The high speed relay is shown as having a directional effect, as is the case of the low speed relay, but this is not necessary since the low speed relay controls the connection of the three-wire circuit to the armature of motor M in the proper direction.

If the initial unbalance of the potentiometer is relatively small, for example, not over 5% of its full range, the recorder system will operate to balance the potentiometer at low speed. When a balance is reached, the low speed relay will operate to cut off the supply of current to motor M, and the brake armature will engage and quickly bring the system to rest.

Assume, however, the initial balance of the potentiometer to be more than 5% of its full range. Under this condition the low speed relay will operate, and in addition the high speed relay will also operate because the output of the first power tube P1 will be sufficiently high to actuate the high speed relay. When the high speed relay operates, as before stated, the governor control contacts 34 and 50 are cut out of the motor control circuit so that the current flows directly through the series resistance 58, motor M, and the brake relay coil 36. Thus, the brake armature 44 disengages, and the motor quickly accelerates to the high speed which is limited only by the resistance 58. This high speed continues until the potentiometer is balanced to within 5% of its range, at which time the high speed relay returns to its normal open position because the plate current in power tube P1 has been reduced and no longer actuates the relay, and this opens the driving motor circuit. When this action takes place the driving motor is running at high speed, the governor contacts 34 and the auxiliary contacts 50 are open, and consequently no current is supplied to the motor M, so that the brake relay coil 36 is deenergized, contacts 39' are closed, and the brake goes on and decelerates the system. When the speed of the motor is reduced to approximately 200 R. P. M., or other suitable speed, the governor auxiliary contacts 50 close, and allow current to flow to the armature of motor M and the brake relay coil 36 to energize the same and release the brake. Because of the resistance 51 in series with the motor armature, the current through the auxiliary contacts 50 is not sufficient to run the motor, and the system continues to decelerate until the motor is at a speed of approximately 150 R. P. M., when the governor contacts 34 again close and governing action takes place. The system then operates at low speed to balance the potentiometer. An important advantage of the system is that the full torque of the motor M is available at both high and low speeds.

It is clear that the vacuum tube amplifier must operate over a wide range of input power. For a very small input to the amplifier, the first power tube P1 functions only as an amplifier tube to supply the last power tube P2. When the input rises to a given value, however, the last power tube will be fully loaded, and for this value of input, corresponding to an unbalance of the potentiometer in excess of 5% of its full range, the plate current in the last power tube may reach excessive values. In order to prevent this, a glow discharge lamp 86, for example, a small neon lamp, is connected to the grid circuit of the power tube to short-circuit the input transformer connected to the tube whenever the voltage across the lamp rises to a certain value, as the ionization voltage of the lamp 86, at which time a discharge will take place through the lamp, which discharge stops when the voltage drops below the given value. The action of the glow lamp limits the excursion of the positive charge on the grid of the power tube, and so prevents excessive values of plate current.

If the input to the amplifier be increased, it will load the first power tube P1, and if full input be supplied it would overload this tube, and therefore a glow lamp 85 is used with the first power tube in the same manner as with the last tube. The excursion of the grid can be limited to a value less than the critical voltage of the lamp by inserting a biasing battery L in circuit with the lamps, as shown.

Another useful function of the lamps is that they limit the voltage across the outputs of the transformers by effectively short circuiting the same. The importance of this will be appreciated when it is considered that the step-up ratio of the transformer may be 20 or more, and the secondary voltage might, therefore, be increased to thousands of volts.

Fig. 3 discloses a modification of the invention which is adapted to be used where the magnitude of a mechanical movement, for example, movement of a pressure gauge, is caused to actuate control structure in accordance with departure of the pressure condition from a predetermined magnitude.

A pipe line 70, which may have a fluid flowing therein, may be maintained at a given pressure, as by a valve 71 for controlling the pressure within the line. The pressure gauge 72, which may comprise a Bourdon tube, or equivalent, has a member 73 which expands and contracts in accordance with variations in pressure from a predetermined magnitude in line 70. The movement of the member 73 is translated by levers 74 and 75 into rotary motion to operate a shaft, indicated by the broken line, the shaft controlling the position of a switch arm 76, pivotally mounted at 77, and adapted for rotation in either direction dependent upon the direction of movement of the Bourdon tube. The switch comprises two contact strips 78 and 79 respectively connected to different legs of a three-wire supply system S which energizes the armature of motor M in either direction, as in the system of Fig. 1. Electrically connected to the motor and governor mechanism are the lower switch contact members 80 and 81, so that if the switch arm 76 is rotated in a given direction, for example, clockwise, the upper contact strip 79 will be connected to contacts 80 and 81 for small and large movements, respectively, of the member 73 of the Bourdon tube. When the arm 76 is rotated in the opposite or counter-clockwise direction, the upper strip 78 is connected to either of the right-hand contacts 80' and 81'. The principle of operation of the control system is the same as that of Fig. 1, as follows:

Assuming the pressure in pipe line 70 to vary, as to decrease, and that this causes switch arm 76 to be rotated in a clockwise direction, this permits a current to flow in one direction from contact strip 79, contact arm 76, contact 80, conductor 82, and governor control contacts 34 to release the electromagnetic brake B and start the motor M. If the departure in the pressure condition is relatively large, however, the contact arm 76 will pass on to engage the contact 81, and this inserts the resistance 58 in shunt to disable the governor contacts in the manner heretofore explained.

The balancing action of the system is attained by reason of the fact that motor shaft 25 operates through worm and gear members 26 and 27 to control the position of valve 71 connected thereto, as by a shaft or other means, indicated by the broken line. When the position of the valve is such that the pressure in line 70 is restored to a predetermined magnitude, the switch arm 76 will have been returned to its open position, and motor M will be deenergized thereby.

As appearing in the claims, the expression "controlled structure" or like language is used to comprehend a recorder pen, or equivalent, a variable impedance or resistance of a measuring network, and/or a valve or other means capable of affecting or varying the magnitude of a condition.

What we claim is:

1. A control system comprising means for actuating control apparatus at low speed upon the occurrence of a given departure from a predetermined magnitude of a condition, and for actuating the apparatus at high speed for a larger departure from said predetermined magnitude, means for applying braking means to the apparatus when its speed is changed from high to low, means for releasing the braking means when and so long as the apparatus is actuated at low speed, and means for applying the braking means to stop the apparatus from low speed operation when the actuating means is deenergized.

2. A control system comprising means for producing an effect upon the occurrence of a given unbalanced condition due to departure from a predetermined magnitude of a condition, which effect varies in magnitude and direction in accordance with the amount and direction of unbalance, means for restoring a condition of balance, a motor for driving said last named means, means for causing the motor to run at high speed when said effect is relatively large and to run at low speed when the effect is small, and means for applying a brake to the motor when its speed is changed from high to low, said means releasing the brake when and so long as the motor is running at low speed, and applying the brake to stop the motor from low speed operation when a condition of balance obtains.

3. In a control system for recorder mechanism having controlled structure, means for producing an electric current whose voltage and direction of flow vary in accordance with the departure from a predetermined magnitude of a condition, of means for modulating said current and impressing its alternating current component upon the input circuit of a thermionic amplifier, a plurality of electro-magnetic relays connected to output terminals of the amplifier and selectively actuated thereby, said relays causing actuation of the controlled structure at high speed for a relatively large departure, and at low speed for a small departure, of the condition from said predetermined magnitude.

4. In a control system for recorder mechanism having controlled structure, means for producing an electric current whose voltage and direction of flow vary in accordance with the departure from a predetermined magnitude of a condition, of electromotive means for driving the controlled structure at different speeds, relay means controlled by said electric current for causing the electromotive means to move at high speed for relatively large departures, and at low speed without braking for small departures of the condition from said predetermined magnitude, means for braking the electromotive means during the change from high to low speed, means for causing the brake to be continuously released during low speed and for applying the brake when the electromotive means is deenergized at low speed.

5. In a control system for recorder mechanism having controlled structure, means for producing an electric current whose voltage and direction of flow vary in accordance with the departure from a predetermined magnitude of a condition, of an electric motor for driving the controlled structure at different speeds, a centrifugal governor for limiting the speed of the motor, and relay means controlled by said electric current for disabling the governor and causing the motor to run at high speed for relatively large departures from said predetermined magnitude, said relay means restoring the control of the governor and causing the motor to run at slow speed for relatively small departures.

6. In a control system for recorder mechanism having controlled structure, means for producing an electric current whose voltage and direction of flow vary in accordance with the departure from a predetermined magnitude of a condition, of an electric motor for driving the controlled structure at different speeds, a governor for limiting the speed of the motor, relay means controlled by said electric current for disabling the governor and causing the motor to run at high speed for relatively large departures from said predetermined magnitude, said relay means restoring the control of the governor and causing the motor to run at slow speed for relatively small departures, means for applying a brake to the motor during the change from high to low speed, and means for maintaining the brake released during low speed operation under control of the governor and to apply it when the motor is deenergized.

7. In a control system for a potentiometer recorder having controlled structure for recording the changes in magnitude of a condition, a potentiometer circuit including a variable impedance, means for producing an electric current when there is a departure from a predetermined magnitude of a condition, the voltage and direction of said current varying in accordance with the direction and amount of unbalance of the potentiometer, of an electric motor for driving the controlled structure and adjusting said impedance to balance the potentiometer, means for causing the motor to run at high speed for a relatively large amount of unbalance of the potentiometer, and at low speed for a relatively small amount of unbalance, comprising a plurality of relays selectively operated by said electric current and controlling the motor circuit, and a centrifugal governor for limiting the speed of the motor to said low speed with full torque available, one of said relays disabling the governor when the condition of a large unbalance obtains.

8. In a control system for a potentiometer recorder having controlled structure for recording the changes in magnitude of a condition, a potentiometer circuit including a variable impedance, means for producing an electric current when there is a departure from a predetermined magnitude of a condition, the voltage and direction of said current varying in accordance with the direction and amount of unbalance of the potentiometer, of an electric motor for driving the controlled structure and adjusting said impedance to balance the potentiometer, means for causing the motor to run at high speed for a relatively large amount of unbalance of the potentiometer, and at low speed with full torque available for a relatively small amount of unbalance, comprising a plurality of relays selectively operated by said electric current and controlling the motor circuit, means for braking the motor during the change from high to low speed, and for maintaining the brake released during low speed and for applying it when the motor is deenergized.

9. In a system including a balanceable network, the method which comprises producing an unbalanced voltage in the network of magnitude and sense determined by the change in magnitude of a condition and actuating structure to reduce said voltage for rebalancing of the network at high speed for magnitudes of said voltage greater than a predetermined magnitude and at a governed low speed with full torque available for smaller magnitude of said voltage.

10. In a system including a balanceable network, the method which comprises unbalancing the network to produce an alternating current whose phase and amplitude corresponds to the sense and magnitude of the change of a condition, and actuating structure in a direction determined by the phase of said current to reduce unbalance of the network, and at high speed for magnitudes of said alternating current above a predetermined magnitude, and at a predetermined low speed for smaller magnitudes of said alternating current.

11. In a control system for mechanism having controlled structure, means for producing an alternating current whose phase and amplitude is determined by the sense and extent of change of a condition, motive means for actuating said structure, a source of alternating current of the same frequency as said produced current, and relays, each having a winding energized by said produced current and a winding energized by current from said source, one of said relays being responsive to the phase of said produced current to determine the sense of actuation of said structure at slow speed, and the other of said relays being responsive to high amplitudes of said produced current to effect actuation of said structure at high speed in the sense predetermined by said first relay.

12. A control system comprising a motor, a brake coil controlling deceleration of the motor, a governor having one set of contacts for maintaining the speed of the motor at a predetermined magnitude and a second set of contacts controlling the circuit of said coil to effect braking at speeds higher than said predetermined magnitude, and means controlling the circuit of said coil to effect braking when the motor is deenergized to bring it to rest from said predetermined speed.

13. A control system comprising a motor, a brake coil controlling deceleration of the motor, a governor having one set of contacts for maintaining the speed of the motor at a predetermined magnitude and a second set of contacts controlling the circuit of said coil to effect braking at speeds higher than said predetermined magnitude, and means for shunting both sets of contacts to effect operation of said motor at a speed higher than said predetermined magnitude without braking.

14. A control system comprising a motor, a governor having one set of contacts for maintaining the speed of said motor constant at a predetermined magnitude, and a second set of contacts operated at a second predetermined speed in excess of said predetermined magnitude, a brake coil controlled by said second contacts, and means independent of the position of said contacts for controlling the motor and brake coil circuit to effect operation of said motor at a speed in excess of said second predetermined speed.

15. A control system comprising control apparatus, a multi-stage amplifier, means for impressing an alternating current voltage upon the input system of said amplifier, means included in a stage of said amplifier and responsive to effect operation of said apparatus at a certain speed for magnitudes of said alternating current input voltage within a certain range, and means included in a stage of said amplifier in advance of said first-mentioned stage and responsive to effect operation of said apparatus at a different speed for magnitudes of said alternating current input voltage within another range.

16. A speed control system comprising control apparatus, a multi-stage amplifier, means included in a stage of said amplifier and responsive to effect operation of said apparatus at a low speed for a certain range of amplifier input voltage, and means included in another stage of said amplifier and responsive to effect operation of said apparatus at higher speed for another range of amplifier input voltage.

17. A control system comprising means for producing an electrical effect of magnitude determined by the change in magnitude of a condition, a multi-stage amplifier for amplifying said electrical effect, controlled apparatus, means included in a stage of said amplifier to effect operation of said controlled apparatus at low speed for a predetermined range of changes in magnitudes of said condition, and means included in another stage of said amplifier to effect operation of said controlled apparatus at higher speed for larger changes in magnitude of said condition.

18. A control system comprising an electric motor, a brake coil, a centrifugal governor driven by said motor and having contacts, a device having contacts operable to complete a circuit including said governor contacts, said brake coil and said motor, whereby the motor operates at a speed controlled by said governor, and a speed-controlling switching device having contacts in shunt to said governor contacts and in series with the contacts of said first device.

19. A control system comprising an electric motor, a brake coil, a centrifugal governor driven by said motor having a pair of contacts separable at one speed and a second pair of contacts separable at higher speed, means for connecting said motor and brake coil to a contact of said second pair of contacts, and an impedance, connected between said contact and a contact of said first pair of contacts, of such magnitude that the current passed thereby is insufficient to run said motor but sufficient for operative energization of said brake coil.

20. A control system comprising an electric motor, a brake coil, a centrifugal governor driven by said motor having a pair of contacts separable at one speed and a second pair of contacts separable at higher speed, means for connecting said motor and brake coil to a contact of said second pair of contacts, an impedance, connected between said contact and a contact of said first pair of contacts, of such magnitude that the current passed thereby is insufficient to run said motor but sufficient for operative energization of said brake coil, means for producing an effect whose magnitude is determined by the change in magnitude of a condition, and speed-controlling means comprising a relay responsive to large changes in magnitude of said condition having contacts in shunt to said pairs of governor contacts, and a relay responsive to small changes in magnitude of said condition having contacts in series with said governor contacts.

21. An electrical measuring system comprising means responsive to change in magnitude of a condition, a normally balanced electrical network unbalanced by said responsive means upon change in magnitude of said condition, means having substantially constant sensitivity to and deflecting in response to unbalance of said network, structure operable to rebalance said network, a motor for adjusting said structure, a centrifugal device driven by said motor, and means including said deflecting means and said centrifugal device for controlling said motor to effect high speed adjustment of said structure for large unbalance of said network, and reduction of the speed of adjustment of said structure as balance of said network is approached.

22. An electrical system unbalanced upon change in magnitude of a condition, means having substantially constant sensitivity to and deflecting in response to unbalance of said system, structure adjustable to rebalance said system, a motor for adjusting said structure selectively energized for rotation in one direction or the other depending upon the sense of deflection of said responsive means, a centrifugal device driven by said motor, a brake for said motor operative upon deenergization of said motor, and means including said centrifugal device and said responsive means for controlling said motor to effect high speed adjustment of said structure for large unbalance of said system, reduction of the speed of adjustment of said structure by said motor as balance is approached, and operation of said brake to cause said motor to come to rest with said structure in position of rebalance of said network.

LEO BEHR.
ALBERT J. WILLIAMS, Jr.
JOHN V. ADAMS.